United States Patent Office 2,708,628
Patented May 17, 1955

2,708,628

STABILIZED VITAMIN A COMPOSITIONS

Jacob Christopher Bauernfeind, Pompton Plains, and Louis Magid, Passaic, N. J., assignors to Hoffmann-La Roche Inc., Nutley, N. J., a corporation of New Jersey No Drawing. Application November 17, 1953,
Serial No. 392,770

8 Claims. (Cl. 99—2)

This invention relates to stabilized vitamin A compositions and to methods for preparing them. More particularly, this invention relates to compositions containing fatty acid esters of vitamin A which are stable against loss of activity due to heat and humidity. Still more particularly, the invention relates to synthetic vitamin A fatty acid ester containing compositions.

The vitamin A active compositions prepared according to this invention are useful for administration as such and also for formulations of pharmaceutical preparations such as tablets, capsules, powders, liquid vitamin solutions and the like; and for animal feeds.

Vitamin A esters are unstable, particularly when exposed to air or oxygen under conditions of heat and high humidity. Other materials incorporated in vitamin preparations, minerals or enzyme containing ingredients for example, contribute to loss of vitamin A activity. Preparations containing vitamin A esters frequently deteriorate in their vitamin A activity in a relatively short time when exposed to air under normal storage conditions. Synthetic vitamin A active materials are particularly subject to loss of activity in storage since antioxidants and other preservatives found with vitamin A compounds in naturally occurring sources are not present in the synthetic materials.

According to one aspect of our invention, we have discovered that fatty acid esters of vitamin A such as vitamin A acetate and vitamin A palmitate are stabilized by incorporating a small amount of N,N'-diphenyl-p-phenylene diamine with the vitamin A active compound. Vitamin A active compositions containing N,N'-diphenyl-p-phenylene diamine, hereinafter designated DPD for convenience, are stable and may be exposed to air for long periods of time under conditions of high heat and humidity with relatively little or no loss of activity. The vitamin A compound is also stabilized against the deteriorating influence of other materials incorporated with the vitamin active substance. It is esential that the vitamin A compound and the DPD be in intimate admixture in order to achieve a stable product.

According to a preferred modification of the invention, higher fatty acid esters of polyhydroxy alcohols or their anhydrides or polyoxyalkylene derivatives thereof, hereinafter referred to as higher fatty acid esters, are incorporated with the vitamin A ester-DPD mixture to provide additional humidity resistance in certain forms of the final product. The higher fatty acid esters which are added to the vitamin A containing mixture are of the glycol, glycerol or polyoxyethylene type, e. g. glyceryl monooleate, polyoxyethylene (20) sorbitan monooleate polyethylene glycol (400) monoricinoleate, polyethylene glycol stearate or polyoxypropylene (6) mannitol dioleate. These compounds are employed in a range of about 1 to 10 parts by weight of fatty acid ester per part of vitamin A.

According to a still more preferred form of the invention, lecithin may be incorporated in the vtiamin A active mixture in addition to the DPD and higher fatty acid ester to further enhance the stability of the mixture against various deteriorating influences. Approximately 0.5 to 2 parts of lecithin by weight per part of vitamin A constitutes the preferred range.

Any vitamin A ester, preferably synthetic fatty acid esters of vtiamin A such as vitamin A acetate or vitamin A palmitate, may be stablized by admixture with a small amount of DPD. Both liquid and dry vitamin A preparations are stabilized according to this invention.

The N,N'-diphenyl-p-phenylene diamine, in order to obtain a stable product, must be intimately admixed with the vitamin A compound and the mixing is preferably effected in the liquid phase. Since DPD is a solid which is sparingly soluble in most edible solvents and amounts of that compound in excess of its solubility are frequently used, the liquid mixture may take the form of a suspension. The stabilizer may be dissolved or suspended in a liquid vitamin A compound, such as synthetic vitamin A palmitate, whereby an intimate mixture is easily and directly obtained. Alternatively, the DPD and a liquid or solid form of vitamin A active material, e. g. vitamin A palmitate or acetate respectively, may be dissolved or suspended together in a vehicle such as an edible vegetable or animal oil, for example, corn oil, cottonseed oil, pilchard oil, etc. When a dry vitamin A material is to be produced, the vitamin A compound and DPD must be intimately admixed in the liquid phase prior to formation of the dry product.

The quantity of DPD incorporated in the composition may vary within rather broad limits but amounts within the range of 0.25 mg. to 25 mg. per 1,000,000 U. S. P. units of vitamin A are preferred. An especially preferred range includes 1.0 to 10 mg. of DPD per 1,000,000 U. S. P. units of vitamin A.

Vitamin A active compositions of various potencies can be prepared according to this invention. The DPD may be incorporated in pure synthetic vitamin A palmitate to yield a stabilized liquid vitamin A concentrate at a potency of approximately 1,700,000 U. S. P. units per gram. A water-dispersible, oil-soluble, adsorbable stabilized vitamin A palmitate is prepared by mixing soybean lecithin with approximately an equal amount of synthetic vitamin A palmitate concentrate (1,300,000 U. S. P. units per gram), a higher fatty acid ester and a small amount of DPD to yield a liquid vitamin A active material of 200,000 U. S. P. units per gram. The stabilized concentrate may be diluted with a vegetable oil (1:20 for example) or dispersed in water (1:100 for example) or adsorbed on granular wheat flour (1:20 for example).

Stabilized vitamin A active material in the dry form may also be prepared according to this invention. DPD together with a vitamin A ester such as liquid vitamin A palmitate (pure or concentrate) or vitamin A acetate crystals are emulsified in an aqueous gelatin and/or gum acacia solution with or without an approximately equal amount of a sugar or sugar alcohol and the emulsion is sprayed onto a free flowing pre-dried starch or starch ester (for example, "Dry-Flo," a starch ester distributed by National Starch Products, Inc.) or similar preparation, which partially dehydrates the sprayed droplets and fixes them in beadlet form. Final drying of the beadlets yields a dry powder assaying 500,000 U. S. P. units or less of vitamin A per gram, depending on the proportion of vitamin A concentrate used.

The stabilized vitamin A active composition prepared according to this invention may be administered as such or incorporated in liquid or dry pharmaceutical formulations. The stabilized vitamin A concentrate may be diluted or incorporated in the various preparations in any proportion to obtain a final product containing a vitamin A potency of from 1,000 to greater than 1,500,000

U. S. P. units per gram. When the vitamin material is added to mineral mixtures, for example, a blend comprising bone meal, calcium carbonate and sodium chloride or animal feeds such as broiler mash, turkey breeding mash, chick starter and grower mash, cattle pellets, etc., a fortified feed product of superior stability is obtained.

The following examples are illustrative of the invention.

*Example I*

A stabilized oil solution was prepared by mixing 10 grams of synthetic vitamin A acetate in corn oil (potency 600,000 U. S. P. units per gm.) with 60 mg. of DPD. The solution assayed 100% vitamin A after 21 days' storage exposed to air at 113° F. in an accelerated aging test.

*Example II*

A water-dispersible oil-soluble, adsorbable stabilized vitamin A palmitate concentrate was prepared by mixing 10 gms. of synthetic vitamin A palmitate concentrate (1,300,000 U. S. P. units per gm.), 10 gms. of crude soybean lecithin, 45 gms. of polyoxyethylene (20) sorbitan monooleate, and 130 mg. of DPD to obtain a liquid vitamin A palmitate solution of 200,000 U. S. P. units per gm. Portions of this vitamin A palmitate solution were diluted with corn oil (in a ratio of 1 part of vitamin concentrate to 20 parts of oil), dispersed in water (1:100), and adsorbed on granular wheat flour (1:20).

Vitamin A assays of the various preparations after storage at 113° F. showed 96% retention of vitamin A in the concentrate after 21 days, 100% retention of vitamin A in the oil solution after 10 days, 91% vitamin A retention in the water dispersion after 21 days, and 91% vitamin A retention in the wheat flour adsorbate after 21 days.

Glyceryl monooleate, polyethylene glycol (400) monoricinoleate, polyethylene glycol stearate and polyoxypropylene (6) mannitol dioleate, were substituted for the polyoxyethylene (20) sorbitan monooleate in the above compositions and similar stable products were obtained.

*Example III*

An oil-soluble stabilized vitamin A acetate was prepared by mixing 10 gms. of crude soybean lecithin, 40 gms. of glyceryl monooleate, 60 mg. of DPD, with 10 gms. vitamin A acetate in corn oil (potency 600,000 U. S. P. units per gm.). The above stabilized concentrate was further diluted with vegetable oil (1:10) and the vegetable oil dilution was adsorbed on chick starter and grower mash.

The concentrate, vegetable oil dilution, and fortified chick mash were all stable at elevated temperatures under dry and humid conditions.

*Example IV*

68 gms. of synthetic vitamin A acetate crystals at 70° F. and 2 gms. of DPD were emulsified with 300 gms. of a 50% aqueous gelatin solution under an inert gas. 60 gms. of a 50% sucrose solution were added and thoroughly mixed. The emulsion was then sprayed through a nozzle in the form of small droplets into a body of Dry-Flo (a commercial preparation of starch esters distributed by National Starch Products, Inc.) which partially dehydrated the vitamin A containing gelatin droplets and fixed them in beadlet form. Final drying of the beadlets under vacuum yielded a dry powder containing 535,000 U. S. P. units of vitamin A per gram. The dry gelatin beadlets were stable in air under dry and humid conditions.

Dry vitamin A beadlets prepared as described above were intimately admixed with (1) chick starter and grower mash or (2) a mineral blend comprising approximately 42% bone meal, 42% calcium carbonate and 16% sodium chloride. Each mixture included about ¼ pound of dry vitamin A beadlet per 10 pounds of chick mash or mineral blend. The chick mash and mineral blend showed 88% and 92% retention of vitamin A, respectively, after 10 days at 113° F. and 95 to 100% relative humidity.

We claim:

1. A composition comprising a synthetic fatty acid ester of vitamin A intimately mixed with N,N'-diphenyl-p-phenylene diamine as a stabilizer for said ester.

2. A composition as in claim 1 wherein the N,N'-diphenyl-p-phenylene diamine is incorporated in an amount of from 1.0 to 10 mg. per 1,000,000 U. S. P. units of ester of vitamin A.

3. A composition comprising a synthetic fatty acid ester of vitamin A intimately mixed with N,N'-diphenyl-p-phenylene diamine as a stabilizer for said ester, said composition also containing a higher fatty acid ester of the group consisting of (a) polyhydroxy alcohols, (b) polyoxyalkylene derivatives of polyhydroxy alcohols, (c) anhydrides of polyhydroxy alcohols and (d) polyoxyalkylene derivatives of anhydrides of polyhydroxy alcohols.

4. A composition as in claim 3 wherein the higher fatty acid ester is glyceryl monooleate and the fatty acid ester of vitamin A is vitamin A acetate.

5. A dry beadlet comprising gelatin, sucrose, and a synthetic fatty acid ester of vitamin A intimately mixed with N,N'-diphenyl-p-phenylene diamine as a stabilizer for said ester.

6. A fortified animal feed comprising an animal feed material and a synthetic fatty acid ester of vitamin A intimately mixed with N,N'-diphenyl-p-phenylene diamine.

7. A composition comprising a fatty acid ester of vitamin A intimately mixed with N,N'-diphenyl-p-phenylene diamine as a stabilizer for said ester.

8. A fortified animal feed comprising an animal feed material and a fatty acid ester of vitamin A intimately mixed with N,N'-diphenyl-p-phenylene diamine as a stabilizer for said ester.

References Cited in the file of this patent

UNITED STATES PATENTS

| | | |
|---|---|---|
| 2,417,299 | Freedman | Mar. 11, 1947 |
| 2,474,182 | Kephart | June 21, 1949 |
| 2,496,634 | Melnick | Feb. 7, 1950 |
| 2,518,230 | Freedman | Aug. 8, 1950 |
| 2,562,840 | Caldwell | July 31, 1951 |